United States Patent [19]
Nakajima

[11] Patent Number: 5,805,892
[45] Date of Patent: Sep. 8, 1998

[54] METHOD OF AND APPARATUS FOR DEBUGGING MULTITASK PROGRAMS

[75] Inventor: Takashi Nakajima, Tokyo, Japan

[73] Assignee: NEC Corporation, Tokyo, Japan

[21] Appl. No.: 527,587

[22] Filed: Sep. 13, 1995

[30] Foreign Application Priority Data

Sep. 26, 1994 [JP] Japan .................................. 6-229310

[51] Int. Cl.⁶ .............................. G06F 11/30; G06F 9/455
[52] U.S. Cl. .................... 395/704; 395/183.15; 395/676; 395/677; 364/275.5; 364/281.7
[58] Field of Search .................................... 395/701, 704, 395/670, 676, 677, 183.15, 275.5, 281.7

[56] References Cited

U.S. PATENT DOCUMENTS

| | | | |
|---|---|---|---|
| 4,847,751 | 7/1989 | Nakade et al. | 364/200 |
| 5,371,887 | 12/1994 | Yoshida et al. | 395/650 |
| 5,379,427 | 1/1995 | Hiroshima | 395/650 |
| 5,615,332 | 3/1997 | Yamamoto | 395/183.14 |

FOREIGN PATENT DOCUMENTS 3-27451  2/1991  Japan .
4-291425 10/1992  Japan .

OTHER PUBLICATIONS

Myer, B., "Setting Breakpoints in a Windows NT Debugger", Windows–DOS Developer's Journal v5 n6 p.13(18)., Jun. 1994.

*Primary Examiner*—Emanuel Todd Voeltz
*Assistant Examiner*—Michael T. Richey
*Attorney, Agent, or Firm*—Foley & Lardner

[57] ABSTRACT

An apparatus for debugging multitask programs has an input command interpreter for interpreting an inputted command, a system call issuance coder for issuing a system call from a task to be debugged which is designated by the command, a system call issuance preparator for converting a next execution address of execution environment information of the task to be debugged into an address of the system call issuance coder, and a system call issuance processor for starting the task to be debugged from a debugger monitor and issuing a system call for putting the debugger monitor into a wait state. When a command for designating and putting a desired task, such as a task B to be debugged, into the wait state is inputted from the host, the system call issuance processor processes the execution environment information of the task B with the system call issuance preparator to prepare an environment in which a system call can be issued from the task B. Thereafter, a debugger task is put into the wait state, and a queue manager of an operating system selects the designated task B, which issues a system call with a system call issuance coder and the previously prepared environment.

5 Claims, 9 Drawing Sheets

METHOD OF AND APPARATUS FOR DEBUGGING MULTITASK PROGRAMS

BACKGROUND OF THE INVENTION

1. Field of the Invention

The present invention relates to a method of and an apparatus for debugging programs, and more particularly to a method of and an apparatus for concurrently debugging a plurality of programs, including a debugger monitor program, as a plurality of tasks which are discrete events in an event-driven fashion under the supervision of a real-time operating system.

2. Description of the Related Art

For debugging a coded user-application program, the program is made, i.e., compiled, assembled, and linked, and downloaded into a target, and then debugged by the functions of a debugger. If the program does not operate as expected, then the task program being executed is stopped, the status and context of the task at the time are checked, and the coding of the program is modified until the expected result is achieved. Thereafter, the modified program is remade again and debugged.

A debugger for debugging multitask application programs according to which a plurality of tasks operate under the supervision of an operating system requires debugging functions corresponding to the real-time operating system in addition to debugging functions for single-task programs.

One of such required debugging functions is a function to have a debugger issue a system call for requesting a system service for an operating system upon demand from the user.

FIG. 1 of the accompanying drawings illustrates an arrangement of a conventional system in which a debugger is used as one of multiple tasks, and a basic arrangement of the debugger.

As shown in FIG. 1, an operating system (OS) 200 has a priority queue manager 210 which manages execution environment information 220, 222~22n of respective task programs 320', 422~42n, and selects an executable task from the queue. Of the task programs which operate under the supervision of the operating system 200, the debugger task program 320' has a command interpreter 322 for interpreting a command inputted from the user, and a system call issuance processor 324' for issuing a system call if the inputted command represents the issuance of a system call. The other task programs 422~42n are referred to as user applications 400.

The conventional system shown in FIG. 1 is composed of a host 01 to which user commands are inputted and a target 02 for executing inputted user commands. The target 02 has the user applications 400 composed of the "n" task programs 422~42n, a debugger monitor 300', and the operating system 200 for controlling operation of the user applications 400 and the debugger monitor 300'. The host 01 has a command input processor 100 for sending command data to the debugger monitor 300' in response to an inputted user command. The debugger monitor 300' has a communication interrupt processor 310 for processing communications between the debugger monitor 300' and the host 01, and the debugger task program 320' which operates with highest priority among the task programs that are managed by the operating system 200. The operating system 200 has the priority queue manager 210 which holds the execution environment information 220~22n of the debugger task program 320' and the task programs of the user applications 400, and selects an executable task from the queue of tasks.

For issuing a system call from the debugger, the user inputs a system call issuance command to the host 01. The command input processor 100 of the host 01 processes the entered command and sends the processed command to the target 02. In the target 02, the communication interrupt processor 310 issues a system call for starting the debugger task program 320' according to the transmitted command, and the operating system 200 adds the execution environment information 220 of the debugger task program 320' to a queue with highest priority in the priority queue manager 210.

Thereafter, the operating system 200 selects and executes the debugger task program 320'. When started, the debugger task program 320' analyzes command data transmitted from the host 01 and interprets it as a system call issuance command, and issues a designated system call to the operating system 200. The operating system 200 processes the system call, and continues to select and execute the debugger task program 320' with highest priority.

When the debugger task program 320' finishes the process of issuing a system call as requested by the user, the debugger task program 320' issues a system call for quickly putting itself into a wait state. The operating system 200 then removes the execution environment information 220 of the debugger task program 320' from the queue in the priority queue manager 210, and places the debugger task program 320' into the wait state. Thereafter, the operating system 200 selects the execution environment information 222~22n of the user applications 400 in the order of the queue from the priority queue manager 210, and executes the task programs as before.

Japanese laid-open patent publication No. 4-291425 discloses a multitask debugging system which, as shown in FIG. 2 of the accompanying drawings, has managing means for controlling the execution of only a program to be debugged. When a start request is inputted to start the program to be debugged, environment information corresponding to the program to be debugged is registered in a queue. When an indicated stop condition and a state of execution of the program to be debugged agree with each other, the environment information corresponding to the program to be debugged is canceled from the queue. In this manner, the state of execution of the program to be debugged can be controlled without lowering the efficiency with which the processor is used.

Japanese laid-open patent publication No. 3-27451 reveals a real-time operating system which is proposed to solve the problem that if a debugger task itself is included as one of tasks to be debugged, then the inherent operation of the tasks cannot fully be debugged. According to the disclosed real-time operating system, as shown in FIG. 3, a debugger program is regarded as a task which transits according to other rules independent of task state transition rules under the operating system, and a real-time kernel includes a portion for operating the task, so that the inherent operation of the task can be debugged.

The conventional process of issuing a system call has a problem in that when a system call is requested which puts a task to be debugged into the wait state in order to achieve synchronism and communications between tasks, since a debugger task program itself is to be synchronized and communicate with, the task itself that is to be debugged as requested by the user cannot issue a system call for effecting synchronism and communications between tasks, and hence the user's request cannot be met.

Furthermore, when a debugger task varies the contents of the execution environment information of a task, the debugger task does so not through the operating system. Therefore, the internal processing of the operating system suffers a conflict, and induces an erroneous operation. Specifically, the conventional multitask debuggers, e.g., the system disclosed in Japanese laid-open patent publication No. 3-27451 is concerned with the operation of a debugger task, and the system Japanese laid-open patent publication No. 4-291425 is related to the control of execution of a task to be debugged. Either of the disclosed systems fails to have a task that is to be debugged issue a system call which puts the task itself into the wait state in order to achieve synchronism and communications between tasks.

SUMMARY OF THE INVENTION

It is therefore an object of the present invention to provide a method of and an apparatus for debugging multitask programs by having a debugger issue, to a task to be debugged, a system call which puts the task itself into a wait state.

According to the present invention, there is provided an apparatus for debugging multitask programs having a host for receiving user commands including a debugging command, and a target having a plurality of user application programs, a debugger monitor including a debugger task, and a real-time operating system including queue managing means for arranging the user application programs and the debugger monitor as a plurality of tasks in a queue with priority, and concurrently executing the tasks in an event-driven manner according to execution environment information of the tasks, the apparatus comprising input command interpreting means for interpreting a command inputted from the host and detecting a command inputted to the debugger monitor as designating a task to be debugged, system call issuance coder for storing system call issuing means for issuing a system call from a task designated by the command detected by the input command interpreting means, address converting means for converting a next execution address of the execution environment information of the task designated by the command, execution environment information saving means for temporarily saving information containing the next execution address, prior to being converted, in the execution environment information of the designated task to be debugged, and data of the command, and system call issuing means in the debugger task for starting the task to be debugged from the debugger monitor with the command interpreted by the input command interpreting means, and issuing a system call for putting the debugger monitor into a wait state.

According to the present invention, there is also provided a method of debugging multitask programs by registering a debugger program and a plurality of user application programs as a plurality of tasks in a queue under the supervision of a real-time operating system, and concurrently executing the tasks in an event-driven manner, the method comprising the steps of designating a task to be debugged and inputting information of a command for issuing a system call for putting the task into a wait state, storing the information of the command into a stack area of the task to be debugged, with the debugger program, storing a next execution address of the task to be debugged into a predetermined area, issuing a system call for starting the task to be debugged from the debugger program, registering the task to be debugged in the queue with the real-time operating system, issuing a system call for putting the debugger program into the wait state from the debugger program, and issuing a system call for putting the task to be debugged into the wait state according to the information of the command stored in the stack area when the task to be debugged is started.

When a task to be debugged is started, the task to be debugged issues a system call for putting itself into a wait state according to information of a command stored in the stack area. The operating system recognizes a system call issued from the debugger task to be debugged as if issued from the task to be debugged, and can process the system call independently of the processing of the debugger task.

Therefore, by inputting a command, it is possible for the debugger task to cause any of user application programs to issue a system call which designates and puts itself into a wait state for waiting synchronism and communications. Since a program remaking process is dispensed with, the turn-around time of a debugging operation can be shortened.

Since a program can be stopped and a system call can be issued by inputting a command, it is not necessary to reproduce a system state at a particular time in a real-time system. Consequently, programs can be debugged efficiently and flexibly.

The above and other objects, features, and advantages of the present invention will become apparent from the following description referring to the accompanying drawings which illustrate examples of the preferred embodiments of the present invention.

DETAILED DESCRIPTION OF THE PREFERRED EMBODIMENTS

Figure 1:
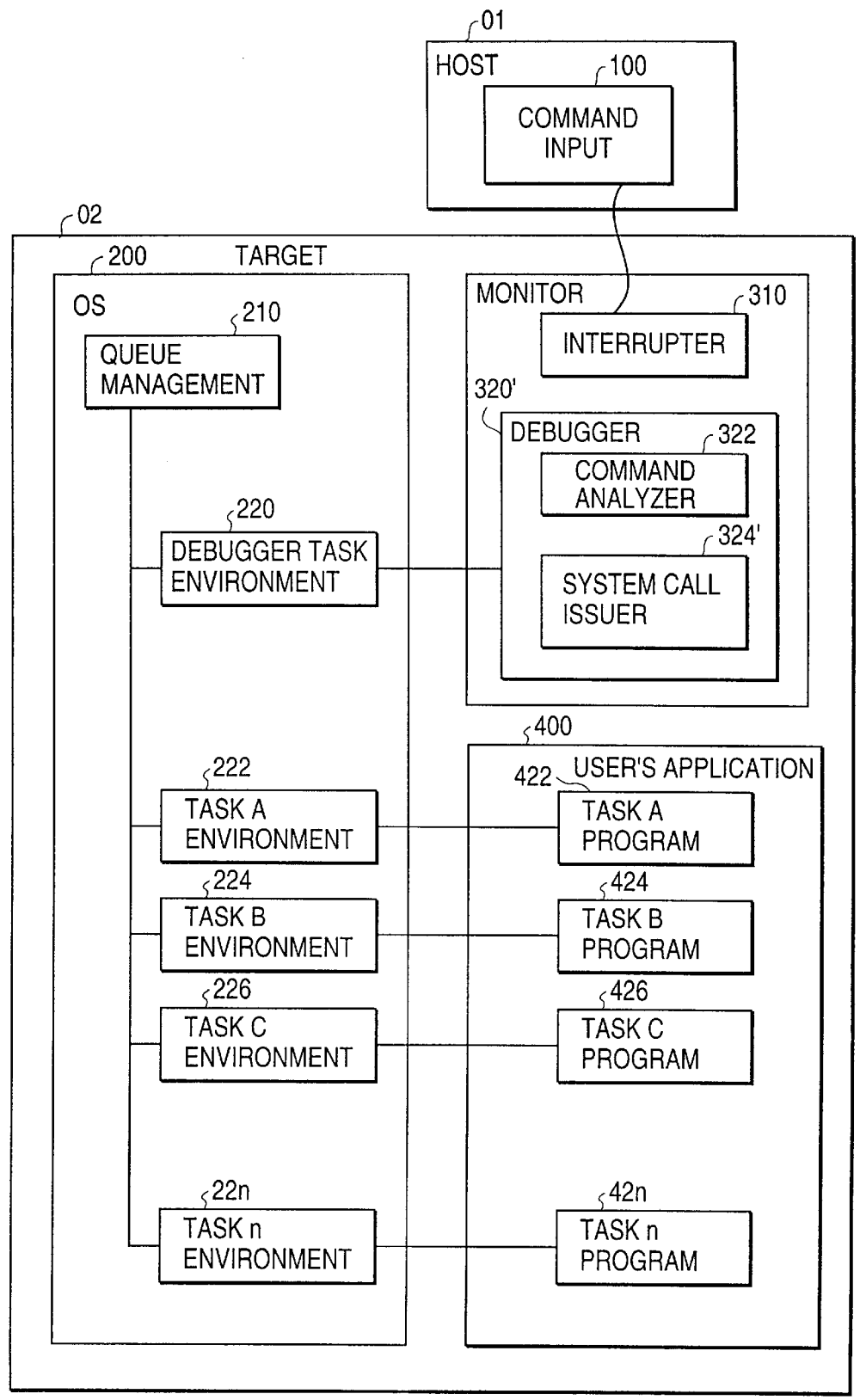
FIG. 1 is a block diagram of a system arrangement of a conventional multitask debugger system.
Figure 2:
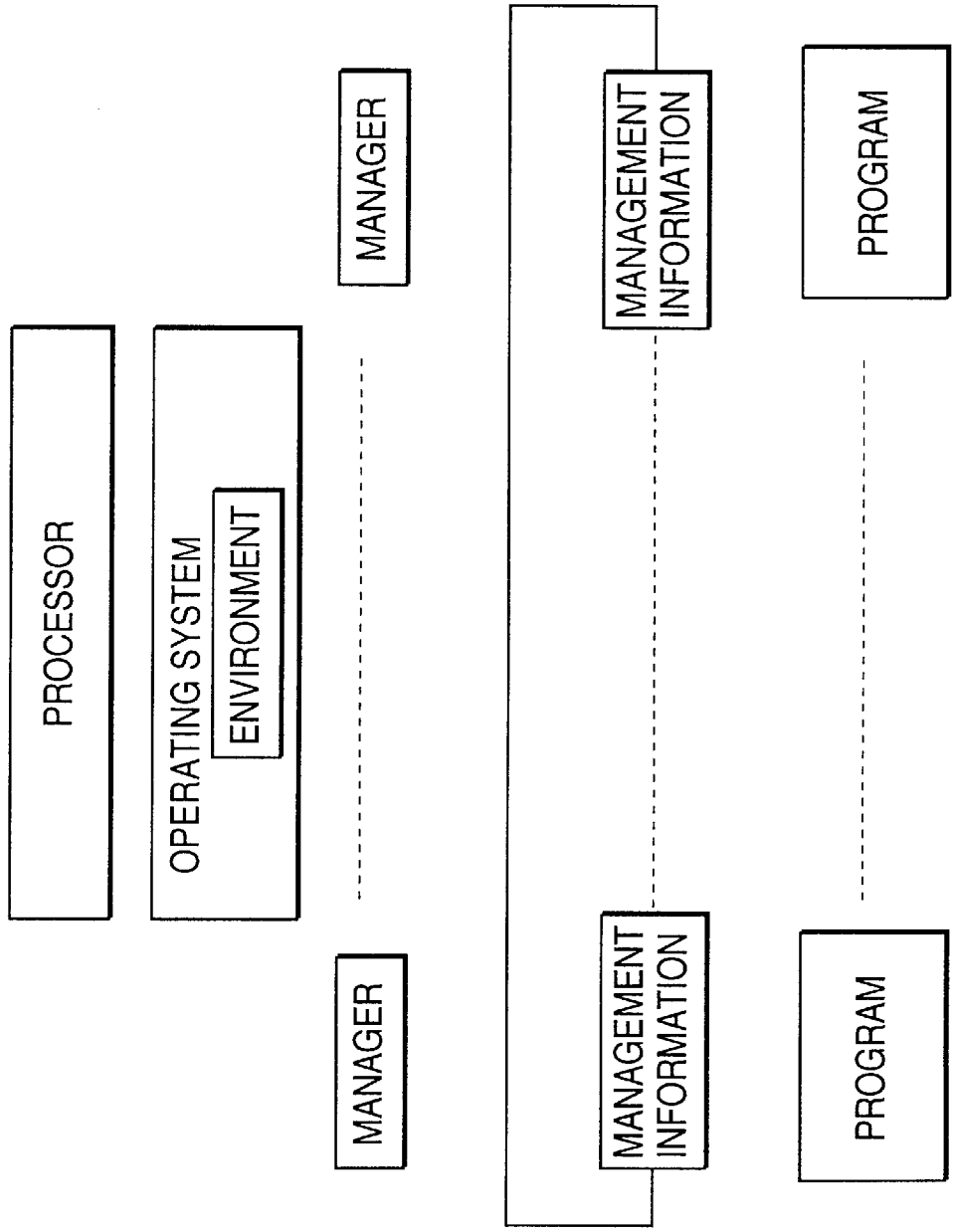
FIG. 2 is a block diagram of a system arrangement of another conventional multitask debugger system.
Figure 3:
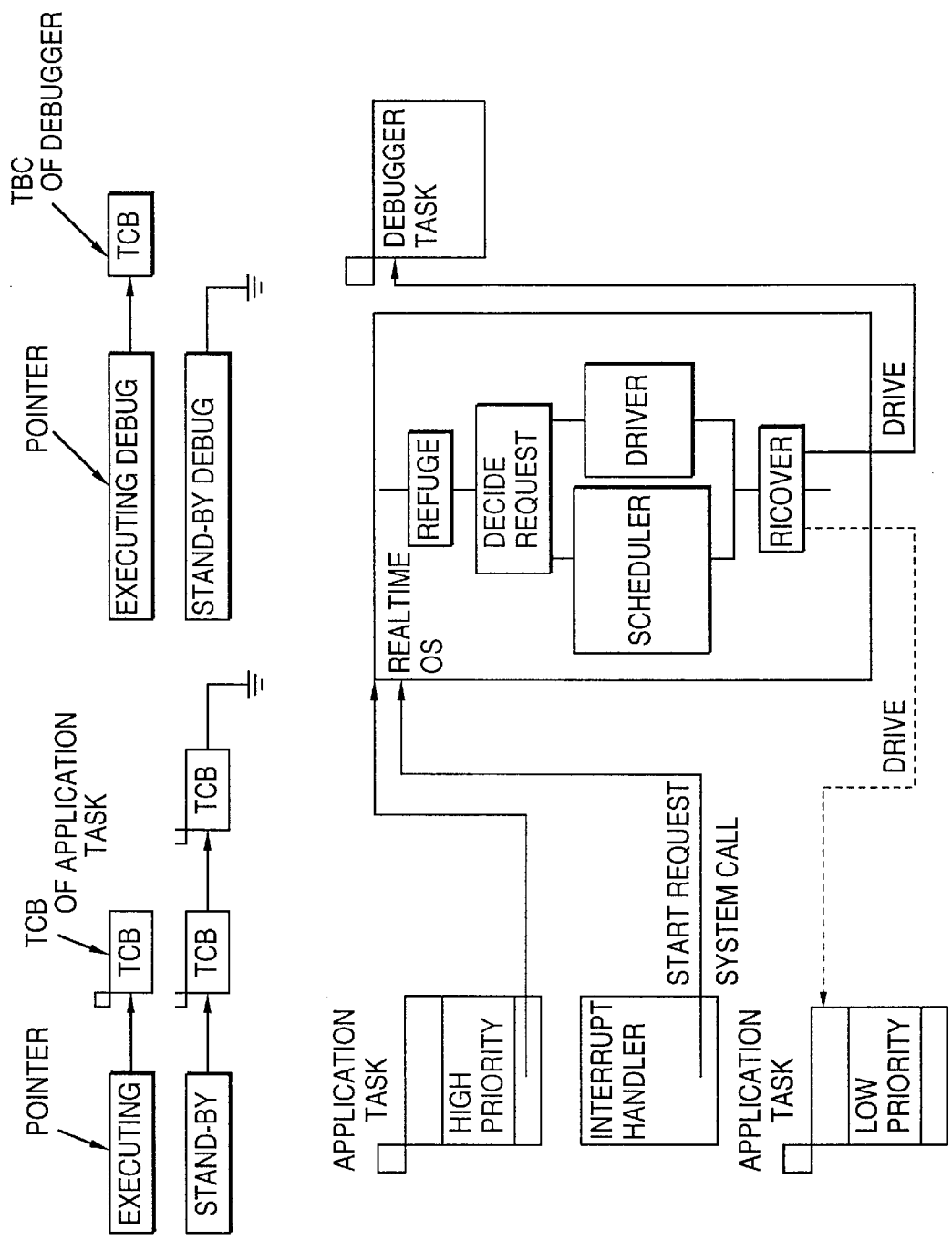
FIG. 3 is a block diagram of a system arrangement of still another conventional multitask debugger system.
Figure 4:
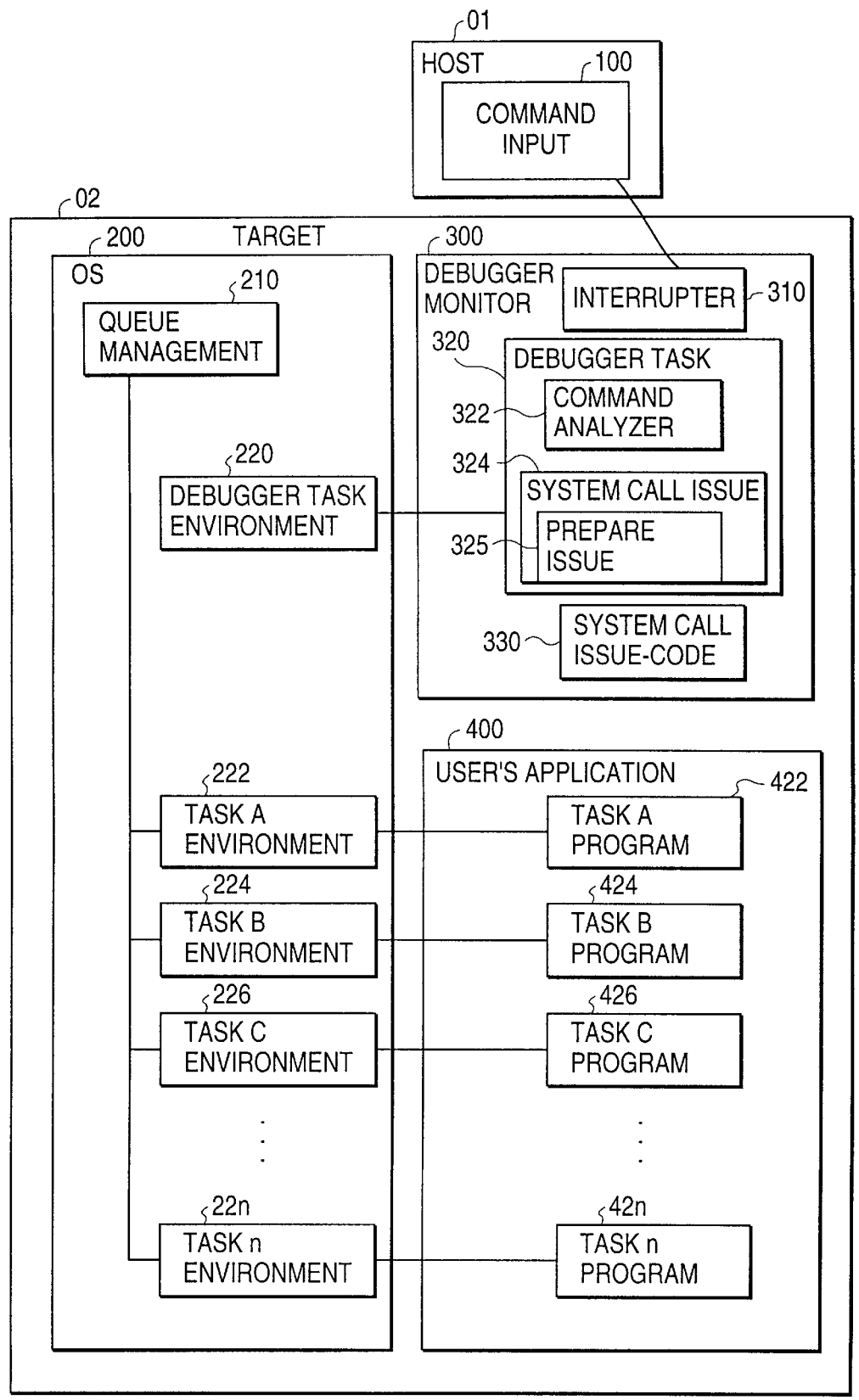
FIG. 4 is a block diagram of a system arrangement of a multitask debugger system according to a first embodiment of the present invention.

As shown in FIG. 4, a multitask debugger system according to a first embodiment of the present invention has components similar to those of the conventional multitask debugger system shown in FIG. 1, except that a debugger monitor 300 additionally has an system call issuance preparator 325 and a system call issuance coder 330. The queue manager 210 of the operating system 200 manages the execution environment information 220, 222~22n of respective task programs 422~42n including a debugger task program 320, selects an executable task from the queue, and debugs the selected task. A system call issuance processor 324 of the debugger task program 320 processes the execution environment information 222~22n of an designated task with the system call issuance preparator 325, and prepares an environment in which the task can issue a system call. When the user designates a desired task and inputs a system call command for the issuance of a system call, the system call issuance processor 324 processes the system call command, processes the execution environment information 222–22n of the designated task with the system call issuance preparator 325, and prepares an environment in which the task can issue a system call. Thereafter, the debugger task 220 and 320 is brought into a wait state, the queue manager 210 of the operating system 200 selects the designated task, and the task issues a system call with the system call issuance coder 330 and the previously prepared environment.

An example of operation of the multitask debugger system according to the first embodiment will be described below.

Figure 6A:
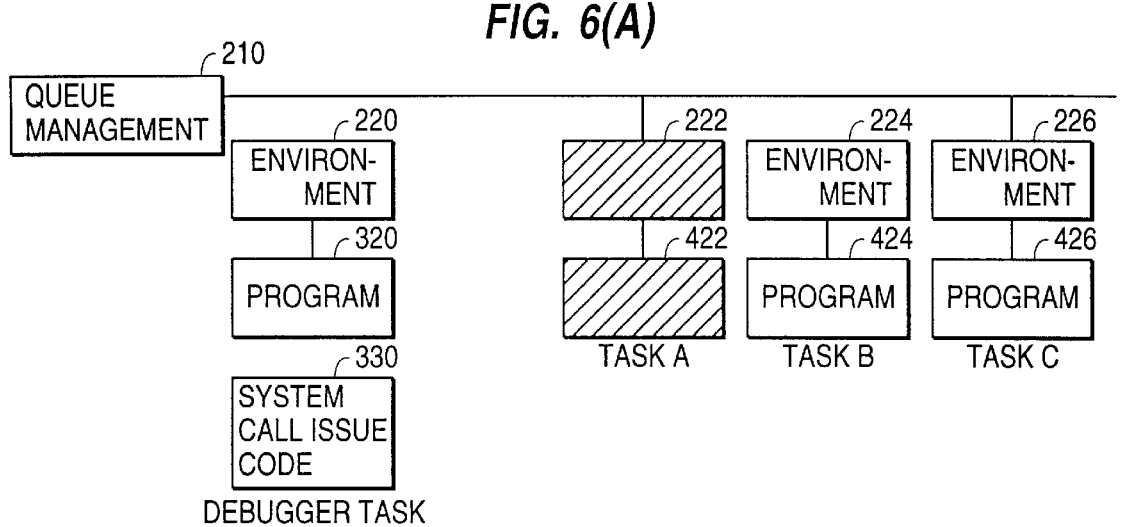
FIGS. 6(A) through 6(F) are block diagrams showing system states of the task transitions at respective times.

In this example, as shown in FIG. 6(A), a task B program 422 which is in the wait state is designated as a task to be debugged while "n" task A~n programs 422–42n of user applications 400 are operating, together with the debugger task program 320, under the supervision of the operating system 200.

First, when the user designates a task B program 424 as a task to be debugged and inputs a system call issuance command to the command input processor 100, the command input processor 100 sends the system call issuance command to the target 02.

Figure 5:
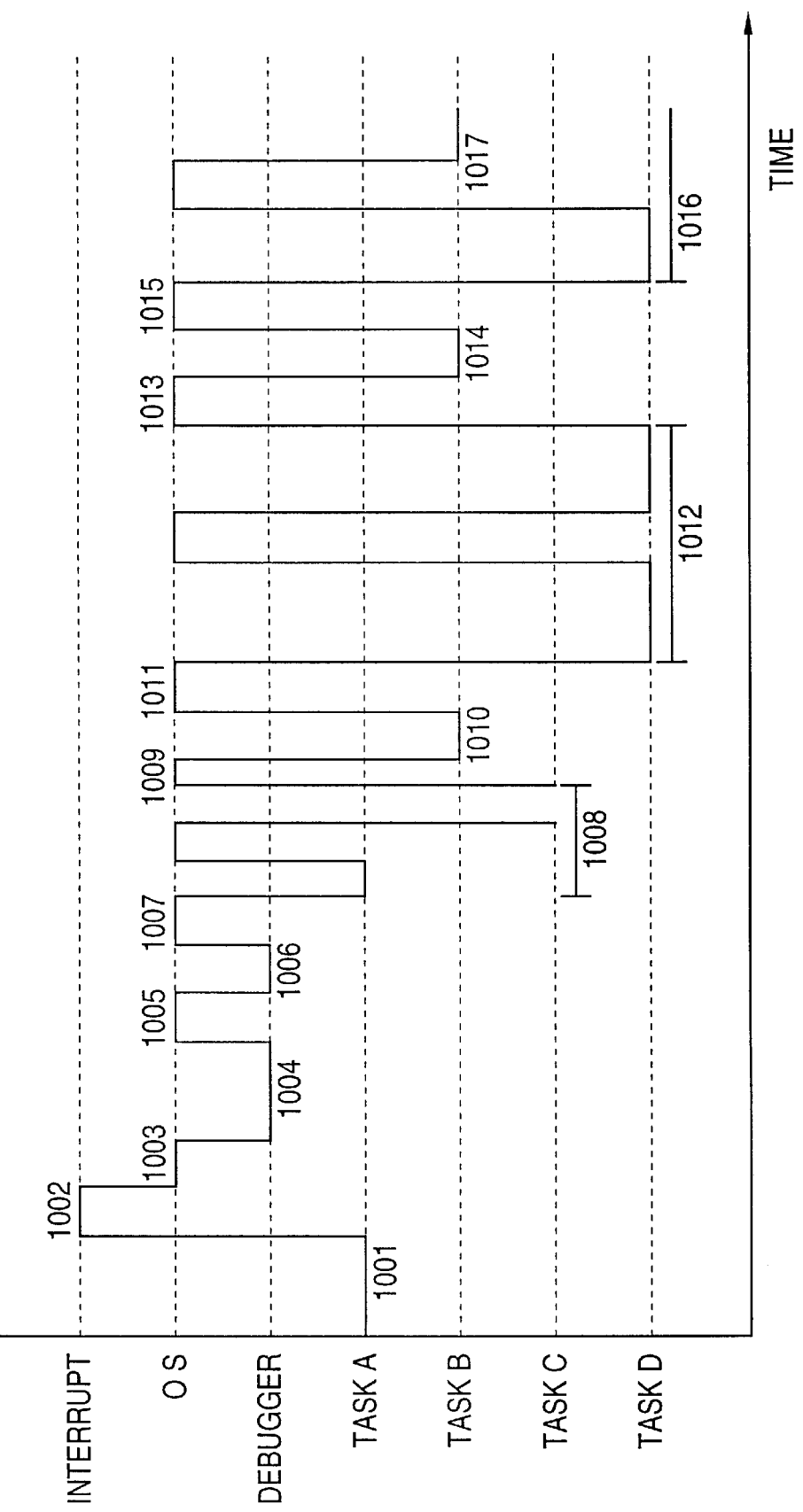
FIG. 5 is a timing chart of task transitions of the multitask debugger system shown in FIG. 4.
Figure 6B:
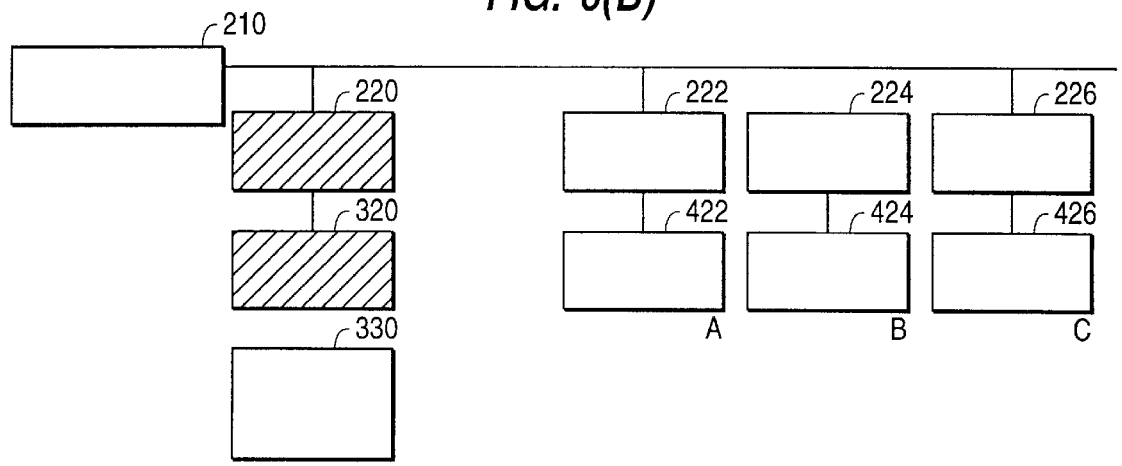

The communication interrupt processor 310 of the target 02 issues a system call for activating the debugger task program 320 with highest priority at a time "1002" (FIG. 5). In response to the system call, the operating system 200 selects and executes the debugger task program 320, and stores the execution environment information 220 of the debugger task program 320 in a highest priority queue in the queue manager 210 at a time "1003" (FIG. 5) as shown in FIG. 6(B).

Figure 6C:
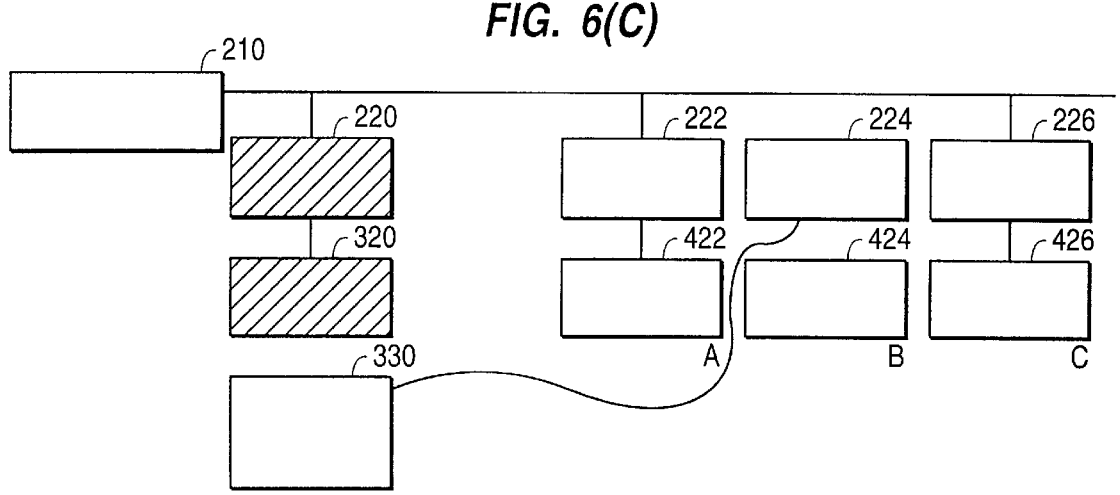

When the debugger task program 320 is started, the command interpreter 322 analyzes a command sent from the host 01, and the system call issuance preparator 325 changes a next execution address of the task B program 424 to the system call issuance coder 330 of the debugger monitor 300. The debugger task program 320 stores and hence saves an original next execution address of the task B program 424 and the type and parameter of a system call to be issued in a stack area of the task B program 424, and issues a system call for activating the task B program 424 at a time "1004" (FIG. 5) as shown in FIG. 6(C).

Figure 6D:
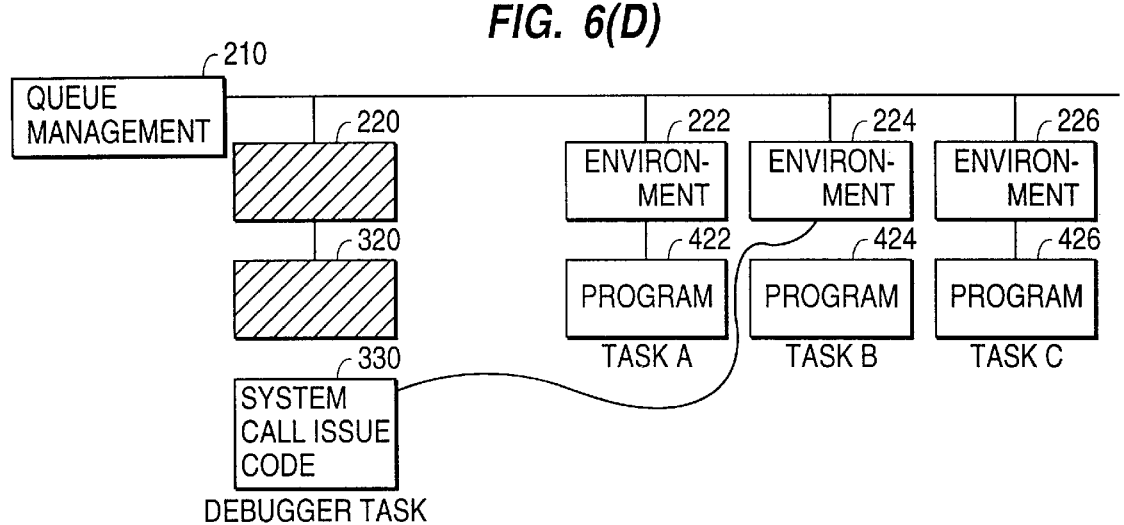

The operating system 200 adds the execution environment information 224 of the task B program 424 to the queue in the queue manager 210, making the task B program 424 executable at a time "1005" (FIG. 5) as shown in FIG. 6(D). The debugger task program 320 issues a system call which puts itself into the wait state at a time "1006" (FIG. 5). Then, the operating system 200 removes the execution environment information 220 of the debugger task program 320 from the queue manager 210, bringing the debugger task program 320 into the wait state at a time "1007" (FIG. 5), and thereafter selects the execution environment information of executable user application tasks on the queue in the queue manager 210 and executes them in the order of priority at a time "1008" (FIG. 5).

Figure 6E:
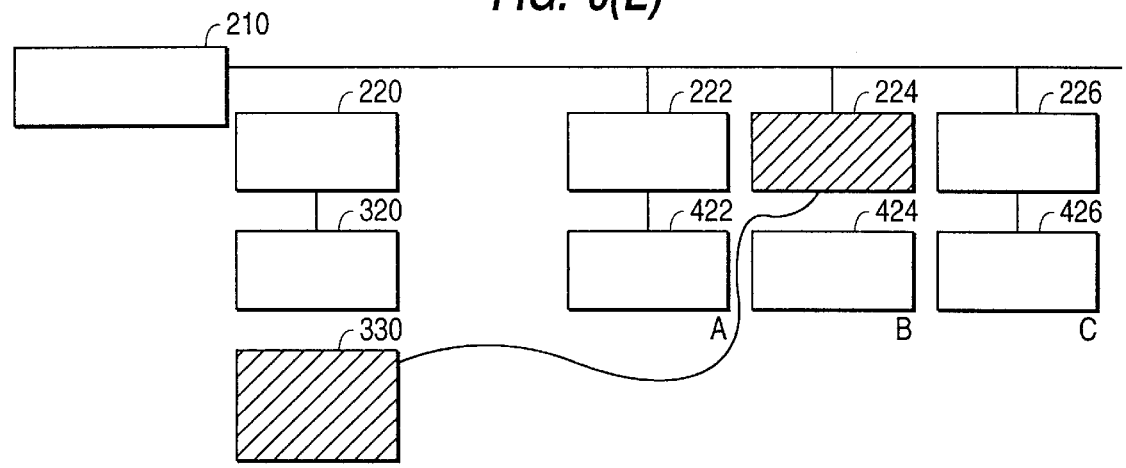

When the execution environment information 224 of the task B program 424 is selected, since the next execution address thereof is the system call issuance coder 330, the system call issuance coder 330 is executed, but the task B program 424 is not executed at times "1009" and "1010" (FIG. 5) as shown in FIG. 6(E). The system call issuance coder 330 refers to the types and parameters of system calls prepared by the system call issuance preparator 325 of the debugger task program 320, and issues a system call requested by the user. Since the system call issuance coder 330 has been executed utilizing the execution environment information 224 of the task B program 424, the operating system 200 interprets the task B program 424 as having issued the system call at a time "1011" (FIG. 5).

If this system call is a system call for putting the task B itself into a wait state for waiting for synchronism and communications, then the execution environment information 224 of the task B program 424 is removed from the queue in the queue manager 210, and hence the task B program 424 is put into the wait state for waiting for synchronism and communications. Another task is selected and executed until the wait state for waiting for synchronism and communications is canceled and the operating system 200 selects the execution environment information 224 of the task B program 424 at a time "1012" (FIG. 5).

Thereafter, when the wait state for waiting for synchronism and communications is canceled at times "1013" and "1014" (FIG. 5), the operating system 200 adds the execution environment information 224 of the task B program 424 to the queue in the queue manager 210, and executes the task B program 424. As shown in FIG. 6(E), the task B program 424 issues a system call for putting itself into the wait state subsequently to the processing of the system call issuance coder 330.

Figure 6F:
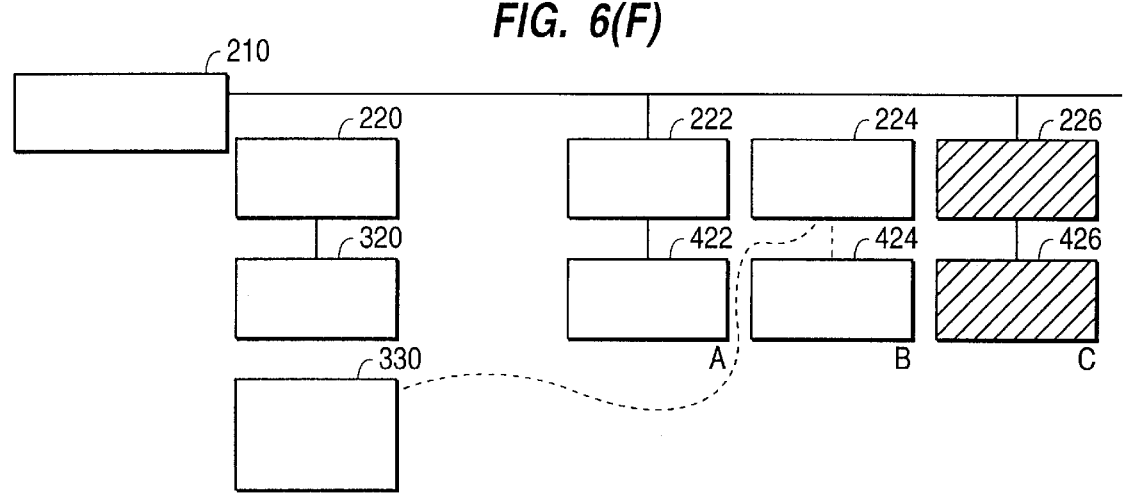

When the operating system 200 removes the execution environment information 224 of the task B program 424 from the queue in the queue manager 210 at a time "1015" (FIG. 5), the task B program 424 is in the wait state. At a time "1016" (FIG. 5), the operation returns to the condition prior to a request for designating an issuing task with a system call issuance command. In this case, however, a next execution address of the execution environment information 224 of the task B program 424 is still in the system call issuance coder 330 as shown in FIG. 6(F).

Thereafter, when the wait state of the task B program 424 is canceled and the operating system 200 selects and executes the execution environment information 224 of the task B program 424 at a time "1017" (FIG. 5), the system call issuance coder 330 returns the saved address in the system call issuance preparator 325 to the task B program 424, which then continues to be executed.

A multitask debugger system according to a second embodiment of the present invention will be described below with reference to FIGS. 7 and 8.

According to the second embodiment, the processing of the multitask debugger system after the operating system 200 has selected and executed the execution environment information 220 of the debugger task program 320 in the first embodiment is modified as follows:

When the debugger task program 320 is started, the command interpreter 322 analyzes a command, detects it as a system call issuance command for designating an issuing task, and then changes a next execution address of the execution environment information 224 of the task B program 424 which is a designated task to the system call issuance coder 330 of the debugger monitor 300 as shown in FIG. 6(C). The debugger task program 320 stores and hence saves an original next execution address of the task B program 424 and the type and parameter of a system call to be issued in a stack area of the task B program 424 that is to be debugged.

Figure 7:
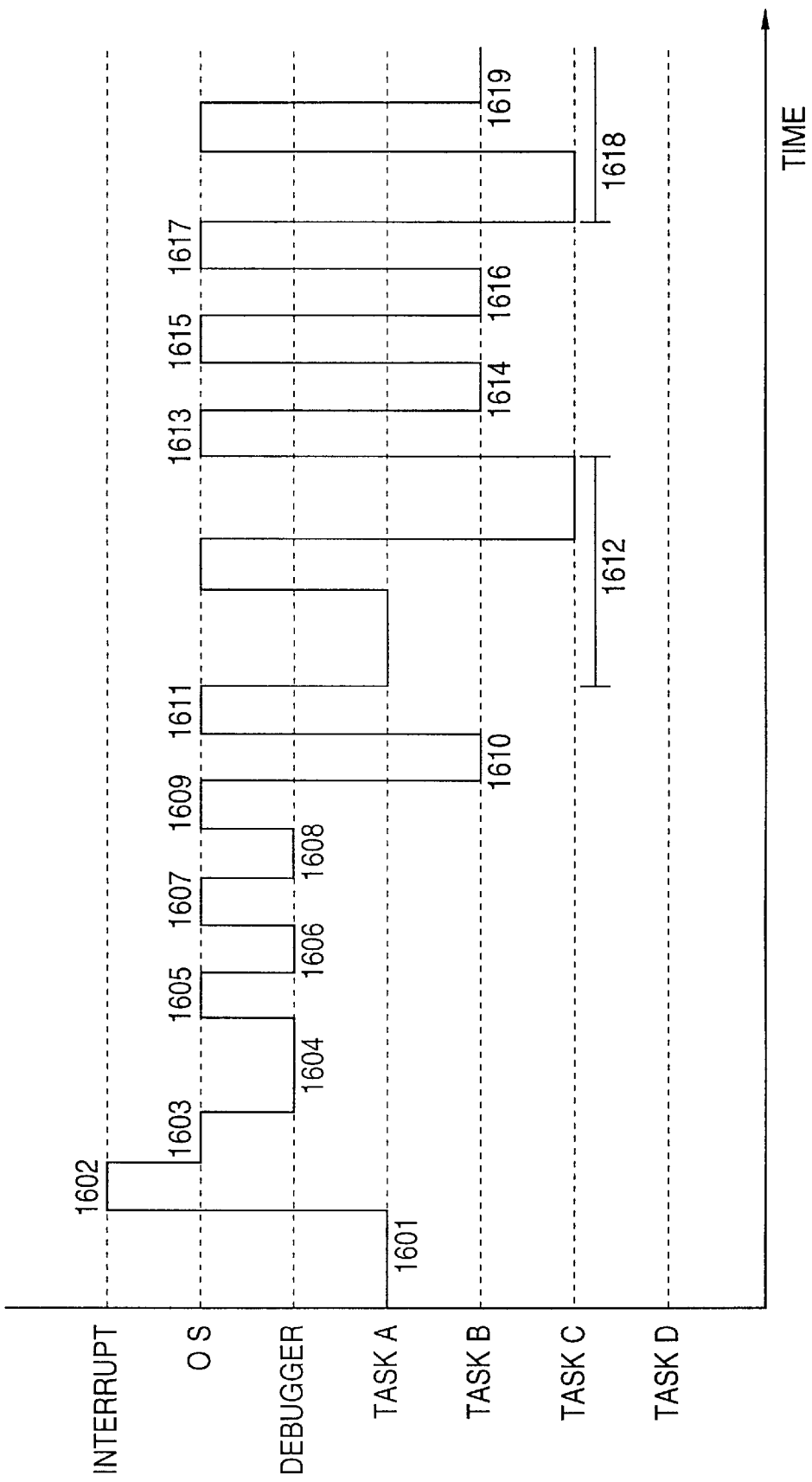
FIG. 7 is a timing chart of task transitions of a multitask debugger system according to a second embodiment of the present invention.

Then, the debugger task program 320 issues a system call to the operating system 200 in order to increase the priority with respect to the task B program 424 at a time "1604" (FIG. 7). In response to the system call, the operating system 200 increases the priority with respect to the task B program 424 at a time "1605" (FIG. 7).

When the operating system 200 receives a system call, which is issued by the debugger task program 320 at a time "1606" (FIG. 7), for activating the task B program 424, the operating system 200 adds the execution environment information 224 of the task B program 424 to the queue at a time "1607" (FIG. 7), making the task B program 424 executable.

Figure 8A:
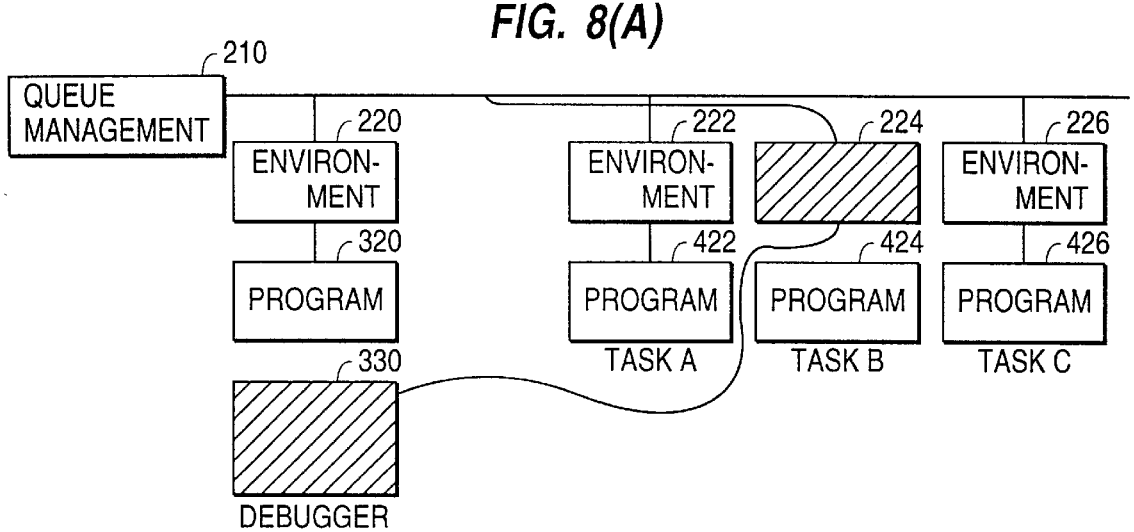
FIG. 8(A) through 8(C) are block diagrams showing system states of task transitions at respective times of the multitask debugger system according to the second embodiment.

Then, the debugger task program 320 issues a system call for putting itself into the wait state at a time "1608" (FIG. 7), removes the execution environment information 220 of the debugger task program 320 from the queue in the queue manager at a time "1609" (FIG. 7), and selects the execution environment information 224 of the task B program 424 which has the highest priority. At this time, however, the system call issuance coder 330, rather than the task B program 424, is executed because the next execution address is the system call issuance coder 330 of the debugger monitor 300 as shown in FIG. 8(A).

When the system call issuance coder 330 is executed at a time "1610" (FIG. 7), it issues a system call as requested by the user by referring to the types and parameters of system calls. Since the system call issuance coder 330 has been executed utilizing the execution environment information 224 of the task B program 424, the operating system 200 interprets the task B program 424 as having issued the system call at a time "1611" (FIG. 7).

Figure 8B:
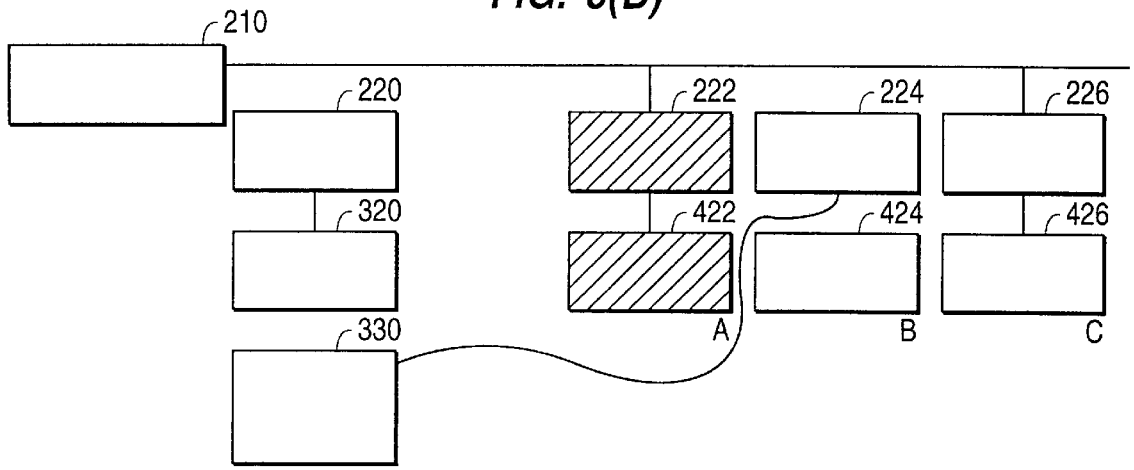

If this system call is a system call for putting the task B program 424 itself into the wait state for waiting for synchronism and communications, then the execution environment information 224 of the task B program 424 is removed from the queue in the queue manager 210 at a time "1612" (FIG. 7), and hence the task B program 424 is put into the wait state for waiting for synchronism and communications as shown in FIG. 8(B).

Figure 8C:
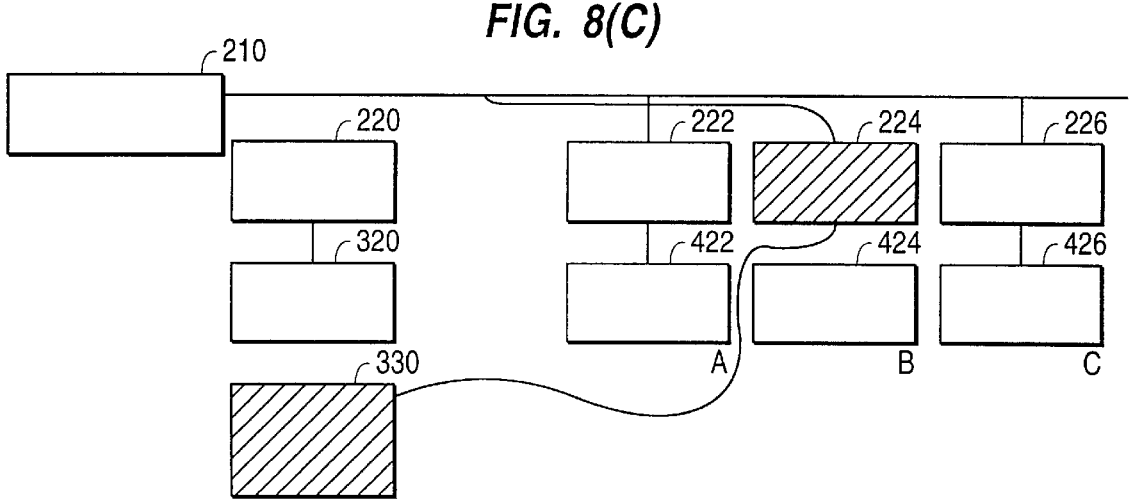

Thereafter, when the wait state for waiting for synchronism and communications is canceled at a time "1613" (FIG. 7), the operating system 200 adds the execution environment information 224 of the task B program 424 to a high priority queue in the queue manager 210, and executes the system call issuance coder 330 as shown in FIG. 8(C).

In response to a system call for returning a priority order issued at a time "1614" (FIG. 7) to its original order while the system call issuance coder 330 being executed, the operating system 200 removes the execution environment information 224 of the task B program 424 from the high priority queue in the queue manager 210, and adds it again to the original priority queue at a time "1615" (FIG. 7). When the system call issuance coder 330 issues a system call for putting itself into the wait state at a time "1616" (FIG. 7), the operating system 200 removes the execution environment information 224 of the task B program 424 from the queue in the queue manager 210, putting the task B program 424 into the wait state at a time "1617" (FIG. 7).

The task B program 424 returns to the condition prior to the issuance of the system call issuance command at a time "1618" (FIG. 7). However, a next execution address of the execution environment information 224 of the task B program 424 is still in the system call issuance coder 330.

Thereafter, when the wait state of the task B program 424 is canceled and the operating system 200 selects and executes the execution environment information 224 of the task B program 424 at a time "1619" (FIG. 7), the system call issuance coder 330 returns the saved address in the system call issuance preparator 325 to the original task B program 424, which then continues to be executed.

It is to be understood that variations and modifications of the method of and the apparatus for debugging multitask programs disclosed herein will be evident to those who are skilled in the art. It is intended that all such modifications and variations be included within the scope of the appended claims.

What is claimed is:

1. An apparatus for debugging multitask programs having a host for receiving user commands including a debugging command, and a target having a plurality of user application programs, a debugger monitor including a debugger task, and a real-time operating system including queue managing means for arranging the user application programs and the debugger monitor as a plurality of tasks in a queue with priority, and concurrently executing the tasks in an event-driven manner according to execution environment information of the tasks, said apparatus comprising:

input command interpreting means for interpreting a command inputted from the host and detecting a command inputted to the debugger monitor as designating a task to be debugged;

system call issuance coder for storing system call issuing means for issuing a system call from a task designated by the command detected by said input command interpreting means;

address converting means for converting a next execution address of the execution environment information of the task designated by said command;

execution environment information saving means for temporarily saving information containing the next execution address, prior to being converted, in the execution environment information of the designated task to be debugged, and data of said command; and system call issuing means in the debugger task for starting the task to be debugged from the debugger monitor with the command interpreted by said input command interpreting means, and issuing a system call for putting the debugger monitor into a wait state.

2. An apparatus according to claim 1, further comprising priority modifying means for increasing the priority in said queue managing means of the task with the next execution address in the execution environment information thereof being modified, as high as the debugger task.

3. A method of debugging multitask programs by registering a debugger program and a plurality of user application programs as a plurality of tasks in a queue under the supervision of a real-time operating system, and concurrently executing the tasks in an event-driven manner, said method comprising the steps of:

designating a task to be debugged and inputting information of a command for issuing a system call for putting the task into a wait state;

storing the information of the command into a stack area of the task to be debugged, with the debugger program;

storing a next execution address of the task to be debugged into a predetermined area;

issuing a system call for starting the task to be debugged from the debugger program;

registering the task to be debugged in the queue with the real-time operating system;

issuing a system call for putting the debugger program into the wait state from the debugger program;

and issuing a system call for putting the task to be debugged into the wait state according to the information of the command stored in the stack area when the task to be debugged is started.

4. A method according to claim 3, wherein the information of the command which is inputted includes a type and a parameter of the system call, and an indicator of the task for issuing the system call.

5. A method according to claim 3, wherein the priority in the queue of the task to be debugged is higher than the priority of other user application programs.

* * * * *